United States Patent
Dionysian

[11] Patent Number: 6,002,782
[45] Date of Patent: Dec. 14, 1999

[54] SYSTEM AND METHOD FOR RECOGNIZING A 3-D OBJECT BY GENERATING A 2-D IMAGE OF THE OBJECT FROM A TRANSFORMED 3-D MODEL

[75] Inventor: Raffi Dionysian, Los Angeles, Calif.

[73] Assignee: Unisys Corporation, Blue Bell, Pa.

[21] Appl. No.: 08/968,019

[22] Filed: Nov. 12, 1997

[51] Int. Cl.$^6$ .................................................. G06K 9/00
[52] U.S. Cl. .......................................... 382/118; 382/154
[58] Field of Search ................................ 382/115, 118, 382/154, 284; 704/273; 340/825.3, 825.31, 825.34; 902/3, 4, 25

[56] References Cited

U.S. PATENT DOCUMENTS

| | | | |
|---|---|---|---|
| 4,055,833 | 10/1977 | Rothfjell | 382/118 |
| 4,975,969 | 12/1990 | Tal | 382/118 |
| 5,063,603 | 11/1991 | Burt | 382/115 |
| 5,283,859 | 2/1994 | Quarendon et al. | 395/127 |
| 5,319,606 | 6/1994 | Bowen et al. | 365/230.06 |
| 5,414,803 | 5/1995 | Malzbender | 395/127 |
| 5,692,115 | 11/1997 | Itoh et al. | 395/127 |

*Primary Examiner*—Yon J. Couso
*Attorney, Agent, or Firm*—Charles J. Fassbender; Mark T. Starr; Steven B. Samuels

[57] ABSTRACT

A method of electronically recognizing a three-dimensional object X includes an enrollment phase wherein a three-dimensional digital model of the surface of the object X is stored in a memory. Thereafter, in an access phase, a two-dimensional access image of an unidentified object is acquired by a camera which views the object from a particular direction which is unpredictable. Then, from the stored three-dimensional model, a two-dimensional image of the model is generated as seen from a selectable viewing direction which approximates the particular direction from which the unidentified object is viewed in the access image. Since the selectable viewing direction of the model approximates the direction in which the object is viewed by the camera, a correlation between the access image of the unidentified object and the image that is generated from the model is very high.

11 Claims, 6 Drawing Sheets

$\theta_{-1}$   $\theta_0$   $\theta_{+1}$

S2a { SELECT THREE POINTS A, B, C ON MODEL
WHERE $A=A_x,A_y,A_z$  $B=B_x,B_y,B_z$  $C=C_x,C_y,C_z$
IDENTIFY CORRESPONDING POINTS A',B',C' ON ACCESS IMAGE
WHERE $A'=A_x',A_y',A_z'$  $B'=B_x',B_y',B_z'$  $C'=C_x',C_y',C_z'$

S2b { FROM MODEL, OBTAIN $A_x,A_y,A_zB_x,B_y,B_zC_x,C_y,C_z$
FROM ACCESS IMAGE, MEASURE $A_y',A_z',B_y',B_z',C_y',C_z'$

S2c { ARBITRARILY PICK $A_x'$
FROM ANY TWO OF THE EQUATIONS 1-3, DETERMINE $B_x'$ AND $C_x'$
EQ. 1 → $(A_x-B_x)^2+(A_y-B_y)^2+(A_z-B_z)^2=(A_x'-B_x')^2+(A_y'-B_y')^2+(A_z'-B_z')^2$
EQ. 2 → $(A_x-C_x)^2+(A_y-C_y)^2+(A_z-C_z)^2=(A_x'-C_x')^2+(A_y'-C_y')^2+(A_z'-C_z')^2$
EQ. 3 → $(B_x-C_x)^2+(B_y-C_y)^2+(B_z-C_z)^2=(B_x'-C_x')^2+(B_y'-C_y')^2+(B_z'-C_z')^2$

S2d { FROM EQUATIONS 4-15, OBTAIN $u_x, u_y, u_z, v_x, v_y, v_z, w_x, w_y, w_z, t_x, t_y, t_z$

SELECT ANY THREE ADJACENT POINTS E', F', G'

61 → THEN $\underline{E'F'}=(F_x'-E_x')\underline{i}+(F_y'-E_y')\underline{j}+(F_z'-E_z')\underline{k}$ 62 → AND $\underline{E'G'}=(G_x'-E_x')\underline{i}+(G_y'-E_y')\underline{j}+(G_z'-E_z')\underline{k}$ 63 → THEN VECTOR $\underline{N}$ NORMAL TO THE PLANE OF E',F',G' IS
$\underline{N}=\underline{E'F'}$ CROSS PRODUCT $\underline{E'G'}=N_x\underline{i}+N_y\underline{j}+N_z\underline{k}$ 64 → THEN THE ANGLE $\psi_N$ BETWEEN VIEWING DIRECTION AND THE VECTOR $\underline{N}$ IS $$\psi_N = \cos^{-1}\left(\frac{N_x}{\sqrt{N_x^2+N_y^2+N_z^2}}\right)$$

Figure 11

SYSTEM AND METHOD FOR RECOGNIZING A 3-D OBJECT BY GENERATING A 2-D IMAGE OF THE OBJECT FROM A TRANSFORMED 3-D MODEL

BACKGROUND OF THE INVENTION

This invention relates to electronic systems for recognizing three-dimensional objects, such as the face of a person; and it relates to the methods by which such systems operate.

One field of use for electronic recognition systems is in the area of security. For example, a person can either be granted access or denied access to a secure area based on whether or not an image of the person's face is electronically recognized by the system. Also, another field of use for electronic recognition systems is in the area of industrial manufacturing. For example, various components which make a product can be selected or rejected by a robotic arm based on whether or not an image of the component is recognized by the system.

In all of the above applications, a key task which needs to be performed as part of the recognition process is that two images must be correlated. One such image is the image of the unknown object which the system is trying to recognize (herein called the access image), and the other image is of the known object which the system uses as a reference (herein called the enrollment image). If the correlation between the access image and the enrollment image exceeds a predetermined threshold value, then the unknown object is recognized.

However, a problem which hinders the correlation step is that a certain degree of misalignment almost always occurs between the access image and the enrollment image. This misalignment occurs because in an operating environment it is impractical to align the known and unknown objects to a camera with exactly the same angles on many different occasions.

As the misalignment between the access image and the enrollment image increases, the correlation between those two images decreases. Consequently, the threshold value to which the correlation is compared, must be lowered in order to recognize an object that is misaligned. However, this presents a dilemma because when the threshold value is lowered, then the probability is increased that the threshold will be exceeded by an object which should not be recognized.

This problem occurs, for example, in the prior art electronic recognition system by Prokoski, et al., which is described in U.S. Pat. No. 5,163,094. In patent '094, an individual who is seeking access through a controlled check point must stop at the entry door and "position himself" relative to a thermal image sensor camera so that a thermal image of his face can be obtained. From that image, a "faceball" is generated; and then an "elemental shape" on a reference faceball is correlated across an area of the currently generated faceball. See patent '094 at column 7, lines 33–37 and lines 46–50.

However, in making this correlation, the area of the currently generated faceball which is correlated to the reference elemental shape must be made large enough to enclose all possible transpositions "which could occur due to twisting, tilting, or tipping of either faceball relative to the other." This is explained in patent '094 at column 7, lines 51–55.

Such twisting, tilting, or tipping of either faceball relative to the other will lessen their degree of correlation. Thus the threshold value for the correlation must be reduced, from what it could be if such twisting, tilting, or tipping did not occur. But, reducing the threshold value increases the probability of the threshold being met by another person who should not be recognized.

Accordingly, a primary object of the present invention is to provide an electronic recognition system in which the above problem is overcome.

BRIEF SUMMARY OF THE INVENTION:

In accordance with the present invention, a method of electronically recognizing a three-dimensional object X includes the following steps. First, in an enrollment phase, a three-dimensional digital model of the surface of the object X is stored in a memory. Thereafter, in an access phase, a two-dimensional access image of an unidentified object is acquired by a camera which views the object from a particular direction which is unpredictable. Then, from the stored three-dimensional model, a two-dimensional image of the model is generated as seen from a selectable viewing direction which approximates the particular direction from which the unidentified object is viewed in the access image. Then a correlation is performed between the access image of the unidentified object and the image that was generated from the three-dimensional model; and the unidentified object is identified as the object X if this correlation exceeds a predetermined threshold.

In one preferred embodiment, the step of generating the two-dimensional image from the three-dimensional model includes the substep of transforming the model, in a three-dimensional coordinate system. After this transformation is performed, the x-axis in the coordinate system corresponds to the direction in which the access image is viewed.

A primary feature of the above-described method is that the two-dimensional image which is generated from the transformed three-dimensional model, has a very high correlation to the access image. This high correlation occurs because due to the transformation, the direction in which the model is viewed and the direction in which the access image is viewed, coincide.

Since the correlation between the image of the transformed model and the access image is so large, the threshold value which must be exceeded in order to gain access to a restricted area can be raised; and, that in turn reduces the rate at which recognition errors occur.

BRIEF DESCRIPTION OF THE DRAWINGS:

FIG. 7 shows substeps S2a–S2d by which twelve parameters $U_X, u_Y, u_Z, v_X, v_Y, v_Z, w_x, w_Y, w_Z, t_x, t_Y, t_Z$ in the FIG. 6 equation are determined.

DETAILED DESCRIPTION

Figure 1:
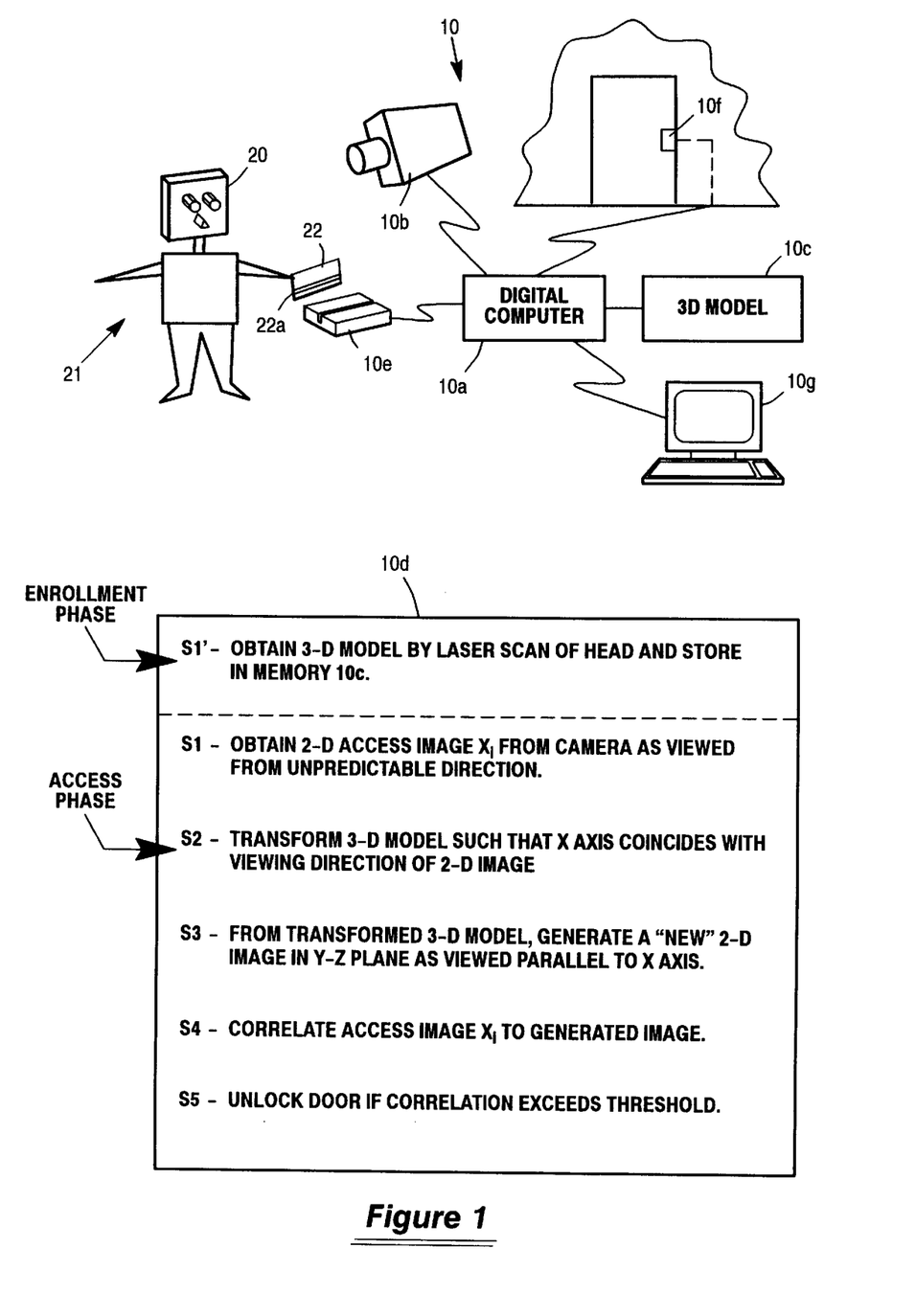
FIG. 1 shows an electronic system which constitutes one preferred embodiment of the present invention, and which recognizes a three-dimensional object, such as the face of a person, by generating a two-dimensional image of the object from a transformed three-dimensional model of the object.

In FIG. 1, an electronic system 10 is shown which constitutes one preferred embodiment of the present invention. This electronic system 10 includes a digital computer 10a, an infrared camera 10b, a memory 10c and a memory 10d, a magnetic stripe reader 10e, an electromechanical lock 10f, and an operator's console 10g. Each of the items 10b–10g is coupled to the digital computer 10a as shown.

In operation, the electronic system 10 recognizes the face 20 of a person 21. To recognize that face, the memory 10d stores a computer program which performs a process that has an enrollment phase and an access phase. Step S1' of this program constitutes the enrollment phase; and steps S1–S5 of this program constitute the access phase.

By step S1', a three-dimensional digital model of the face which is to be recognized is stored in the memory 10c. This model describes the surface of the face 20 by providing the three-dimensional coordinates of a plurality of points which occur on the surface of the face. Also, for each such point, the model provides a pixel value which indicates the amount of heat which is radiated from that point.

Figure 2:
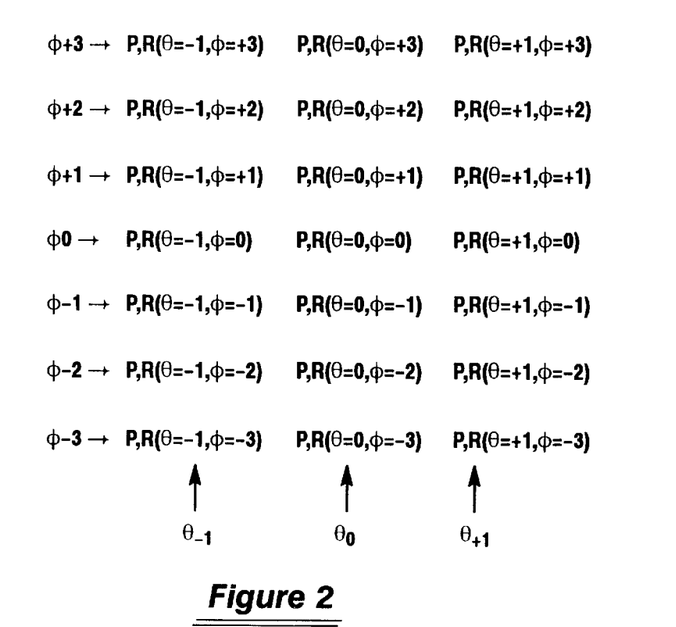
FIG. 2 shows a portion of a three-dimensional model of the face of a person who is to be recognized, which is stored within the FIG. 1 system.

An example of a portion of the above model is shown in FIG. 2. In this model, a spherical coordinate system is used which is centered within the head of the person 21. Also in this model, a plurality of parameters P,R(θ,φ) are provided. Each parameter R(θ,φ) is the radius, at angles θ and φ in the spherical coordinate system, to a point on the surface of the face; and each parameter P is the pixel value at that point.

All of the parameters which occur in column $θ_o$ of FIG. 2 have a spherical coordinate of θ=0°. These parameters occur in a plane which cuts vertically through the face that is being modeled. Similarly, the parameters which occur in column $θ_{+1}$ have a spherical coordinate of θ=+1°; and the parameters which occur in column $θ_{-1}$ have a spherical coordinate of θ=−1°.

All of the parameters which occur in row $φ_0$ have a spherical coordinate of φ=0°. These parameters occur in a plane which cuts horizontally through the head that is being modeled. Similarly, the parameters which occur in row $φ_{+1}$, have a spherical coordinate of φ=+1°; and the parameters which occur in row $φ_{-1}$ have a spherical coordinate of φ=−1°.

To complete the FIG. 2 model, more rows and columns of the parameters P,R(θ,φ) are added to those which are shown. These parameters P,R(θ,φ) define the entire face 20 plus additional surfaces of the head which are in close proximity to the face. Preferably, the additional surfaces include the top and sides of the head, but not the back of the head.

Figure 3A:
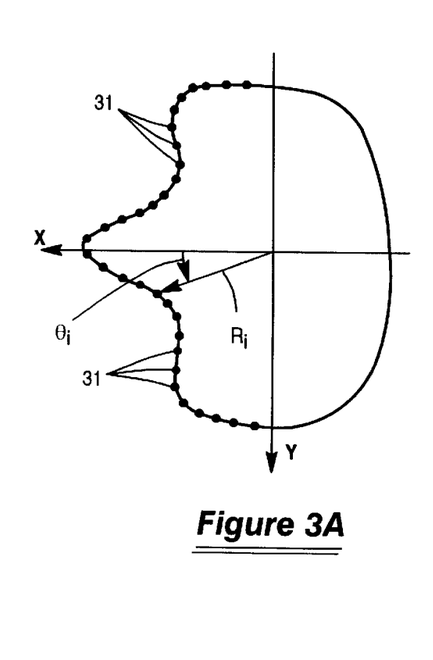
FIGS. 3A–3B show an example of several points which are defined by a parameter $R(\theta,\phi)$ in the FIG. 2 model.

An example of the points which are defined by the parameter R(θ,φ) in row $φ_0$ of the FIG. 2 model is illustrated by the dots 31 in FIG. 3A. There, the radius $R_i$ identifies one particular point which occurs where $θ=θ_i$.

Figure 3B:
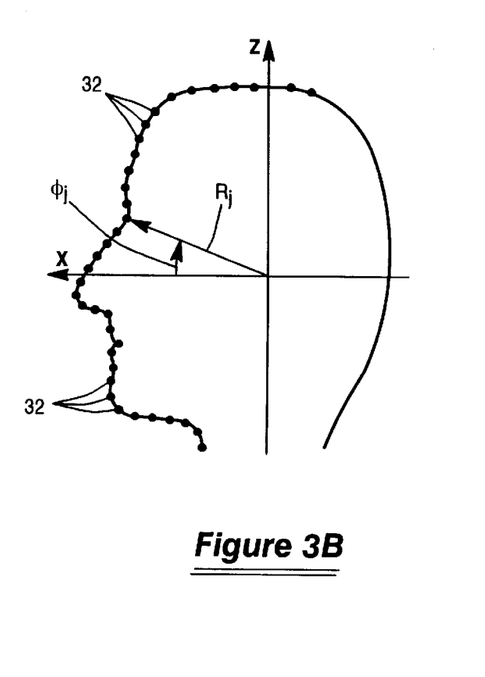

Similarly, an example of the points which are defined by the parameter R(θ,φ) in column $θ_0$ of the FIG. 2 model is illustrated by the dots 32 in FIG. 3B. There, the radius $R_j$ identifies one particular point which occurs when $φ=φ_j$.

For each person who is to be recognized by the FIG. 1 system, the above enrollment step S1' is performed one time; and, a personal identification number (PIN) is stored in the memory 10c along with the corresponding three-dimensional model of the face. This PIN is sent to the computer 10a by passing the magnetic stripe 22a of a card 22 through the reader 10e, or by the operator's console 10g.

After the enrollment phase, the access phase can be performed. This access phase occurs each time, the person 21 seeks access to a restricted area which is secured by the electromechanical lock 10f. If the electronic system 10 recognizes the person's face 20 during the access phase, then the computer 10a sends a signal to the lock 10f which causes it to open.

In Step S1, a two-dimensional infrared digital image $X_i$ of the person's face 20 is taken by the camera 10b. This image $X_i$ is called the access image; and in it, the magnification of the person's face is the same as it is in his three-dimensional model. Alternatively, the face in the access image can have an arbitrary magnification which is subsequently adjusted by the computer 10a to be the same as it is in the model.

But in the access image, the exact angle of the person's face 20 relative to the camera 10b will inherently be unpredictable. This unpredictability occurs because in an operating environment it is impractical to align the person's face 20 to the camera with exactly the same angle on many different occasions.

Figure 4:
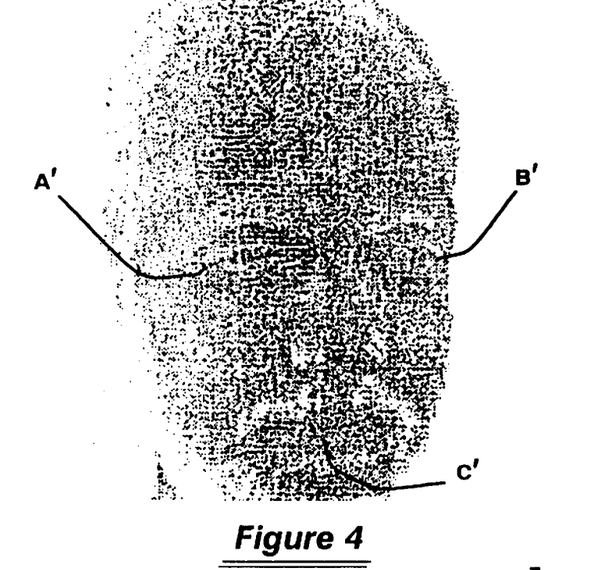
FIG. 4 shows an example of an infrared access image which is obtained by a camera in the FIG. 1 system.

An example of the infrared access image $X_i$ which is obtained in Step S1 is shown in FIG. 4. In this example, the image $X_i$ shows the face 20 when it is turned approximately 10° to the left and tilted approximately 50 down. This is in comparison to an image of a face which looks directly into the camera 10b.

Also in step S1, the person 21 has his PIN entered via the magnetic stripe reader 10e or the operator's console 10g. This PIN selects the one three-dimensional model in the memory 10c which has the same PIN, for use in the subsequent steps of the access phase.

Next, in step S2, all of parameters R(θ,φ) in the three-dimensional model which was selected above, are transformed with respect to the coordinate system such that the X axis of the coordinate system coincides with the viewing direction of the two-dimensional access image. An example of this transformation is illustrated in FIGS. 5A and 5B.

Figure 5A:
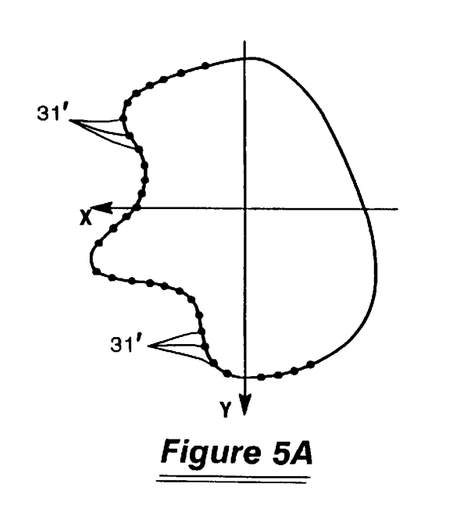
FIGS. 5A–5B show the points of FIGS. 3A–3B after the model of the face in FIG. 2 is transformed such that the x-axis coincides with the viewing direction of the access image in FIG. 4.
Figure 5B:
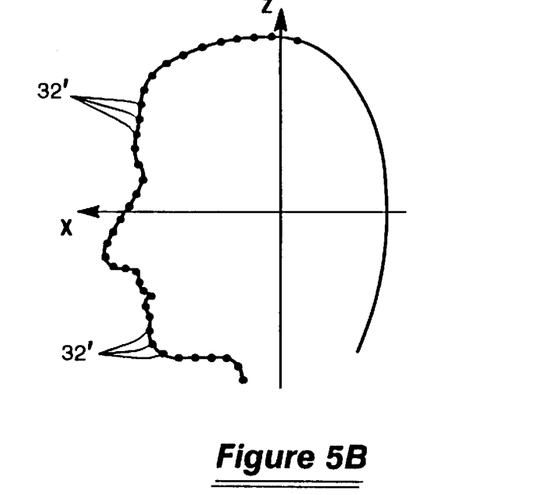

In FIG. 5A, the points 31' which occur are transformed from the points 31 of FIG. 3A; and in FIG. 5B, the points 32' which occur are transformed from the points 32 of FIG. 3B. Due to this transformation of the model, the X-axis of the coordinate system coincides with the direction in which the FIG. 4 access image is viewed.

Figure 6:
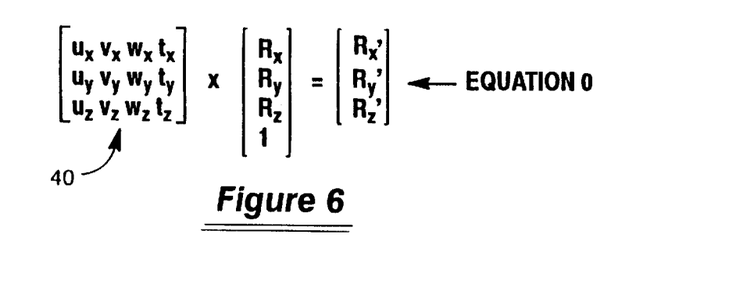
FIG. 6 shows an equation for obtaining all of the points in the transformed model, such as the points in FIGS. 5A–5B.

Preferably, the following substeps are employed to obtain the transformed model from the original model of FIG. 2. First, the spherical coordinates of each parameter R(θ,φ) in the original model are changed to X-Y-Z coordinates $R_x, R_y$ and $R_z$. Then, equation 0 as shown in FIG. 6 is used to convert the coordinates $R_x, R_y$ and $R_z$ to new coordinates $R_x', R_y'$ and $R_z'$ in the transformed model. Then the pixel P which had coordinates $R_X, R_Y$ and $R_Z$ is moved to the new coordinates $R_X', R_Y'$ and $R_Z'$.

Equation 0 includes a transformation matrix 40 in which all of the terms $U_x$, $U_y$, $U_z$, $V_x$, $V_y$, $V_z$, $W_x$, $W_y$, $W_z$, $t_x$, $t_y$, and $t_z$ are initially unknown. However, those terms can be determined as will now be described in conjunction with FIG. 7.

To begin, three predetermined points A, B, and C are selected on the three-dimensional model, and three corresponding points A', B' and C' are identified on the two dimensional access image. This is indicated in FIG. 7 as substep S2a.

An example of the points A', B' and C' is shown on the access image of FIG. 4. There, point A' is the outside corner of the right eye; point B' is the outside corner of the left eye; and point C' is the center of the mouth.

Point A on the original model has three coordinates $A_X$, $A_Y$, and $A_Z$ which are known. Point A' on the transformed model has three new coordinates $A_x'$, $A_Y'$, and A' which are unknown. However, if point A' in the transformed model and point A' in the access image have the same Y-Z coordinates, then the coordinates $A_Y'$ and $A_Z'$ can be measured from the access image. This leaves Ax' as an unknown.

Similarly, point B on the original model has coordinates $B_x$, $B_y$, and $B_z$ which are known; and point C has coordinates $C_X$, $C_Y$, and $C_Z$ which are known. Point B' in the transformed model has coordinates $B_{X'}$, $B_{Y'}$, $B_{Z'}$; and point C' has coordinates $C_{X'}$, $C_{Y'}$ and $C_{Z'}$. In the transformed model and the access image, the coordinates $B_{Y'}$, $B_Z$, $C_{Y'}$ and $C_{Z'}$ are the same; and thus they can be measured in the access image. This leaves $B_{X'}$ $C_{X'}$ as unknowns. All of this is indicated in FIG. 7 as substep S2b.

Next, in substep S2c of FIG. 7, the unknown coordinates $A_{X'}$, $B_{X'}$ and $C_{X'}$ are determined. Coordinates $A_{X'}$ can be selected arbitrarily; but that selection then fixes the other two coordinates $B_{X'}$ and $C_{X'}$ which are determined from any pair of the equation 1–3.

Equation 1 states that the distance between points A and B in the original model is the same as the distance between points A' and B' in the transformed model. Similarly, equation 2 states that the distance between points A and C in the original model and the transformed model is the same; and equation 3 states that the distance between points B and C in the original model and the transformed model is the same.

Preferably, the points A, B and C are selected such that they are far apart from each other. This reduces the magnitude of any errors which may occur in the above described measurements in the access image of the coordinates $A_Y'$, $A_Z'$, $B_Y'$, $B_Z'$, $C_Y'$, $C_Z'$, relative to the magnitude of the distances between those coordinates.

Next, in substep S2d of FIG. 7, equations 4–15 are used to determined $U_x$, $U_Y$, $U_Z$, $V_X$, $V_Y$, $V_Z$, $W_X$, $W_Y$, $W_Z$, $t_x$, $t_y$, and $t_z$. These are twelve equations with twelve unknowns; so the equations 4–15 can be easily solved by the computer 10a.

Equation 4 states that terms $U_x$, $U_y$, $U_z$ define a vector $\underline{U}=U_x\underline{i}+U_y\underline{j}+U_z\underline{k}$ which has a magnitude of one. Here, the terms $\underline{i}$, $\underline{j}$, and $\underline{k}$ are unit vectors on the x, y, and z axis respectively. Similarly, equation 5 states that the terms $V_x$, $V_y$, $V_z$ define a vector $\underline{V}=v_x\underline{i}+v_y\underline{j}+v_z\underline{k}$ which has a magnitude of one.

Equation 6 states that two vectors $\underline{U}$ and $\underline{V}$ are perpendicular to each other. Equations 7–9 define another vector $\underline{W}$ which equals $w_x\underline{i}+W_y\underline{j}+w_z\underline{k}$. Due to equations 7–9, the vector $\underline{W}$ equals the cross-product of $\underline{U}\times\underline{V}$. Thus, $\underline{W}$ is perpendicular to $\underline{U}$ and $\underline{V}$ and $\underline{W}$ has a magnitude of one.

Equations 10–15 are obtained by applying equation 0 of FIG. 6 to the points A, B, C and A', B', C' which were utilized in substep S2a. For example, equations 10-12 are obtained from equation 0 when $R_x=A_x$, $R_Y=A_Y$, $R_Z=A_Z$, $R_X'=A_X'$, $R_Y'=A_Y'$, and $R_Z'=A_Z'$.

After the transformed model is obtained as described above, then step S3 of the access phase is performed as indicated in FIG. 1. In step S3, the transformed three-dimensional model is used to obtain a new two-dimensional image in the y-z plane as viewed along the x-axis.

To obtain the above two-dimensional image, each pixel which is visible in the transformed model as viewed from the $-\underline{i}$ direction, is projected from its coordinates X' Y' Z' in the transformed model to coordinates Y' Z' in the Y-Z plane. This is illustrated in FIG. 8.

Figure 8:
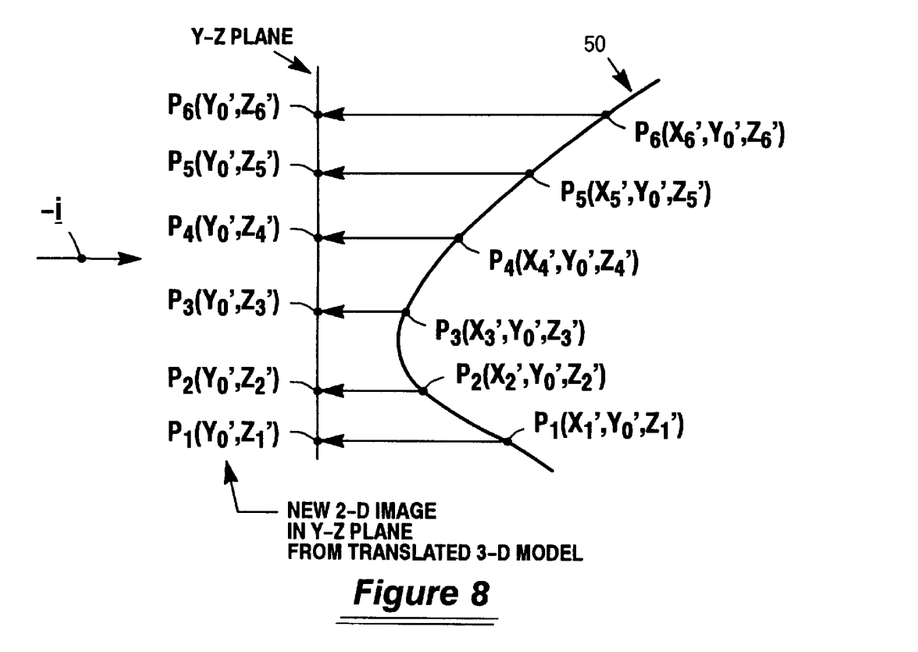
FIG. 8 shows how the pixels in the transformed three-dimensional model are projected onto a plane to generate a two-dimensional image of the model.

In FIG. 8, reference numeral 50 identifies a portion of the nose in the transformed model. That nose portion 50 lies in a plane which is parallel to the X-Z axis and passes through the point $Y=Y_0'$.

Several pixels $P_1$–$P_6$ are shown on the surface of the nose portion 50. Pixel $P_1$ has coordinates $X_1'Y_0'Z_1'$; pixel $P_2$ has coordinates $X_2'Y_0'Z_2'$; etc. When those pixels are projected into the new two-dimensional image in the Y-Z plane, pixel P1 has coordinates $Y_0'Z_1'$; pixel $P_2$ has coordinates $Y_0'Z_2'$; etc.

Next, step S4 of the access phase is performed as indicated in FIG. 1. In step S4, the two dimensional image which was generated in step S3 is correlated to the access image of FIG. 4.

To perform the above correlation, each pixel in the access image is subtracted from a corresponding pixel in the image from step S3; and then, the magnitudes of all of those subtractions are added together and the resulting sum is inverted. In this correlation, the corresponding pixels which are subtracted need not have the same Y and Z coordinates. Instead, the corresponding pixels can be pixels that have Y and Z coordinates that are the closest to each other.

Figure 9:
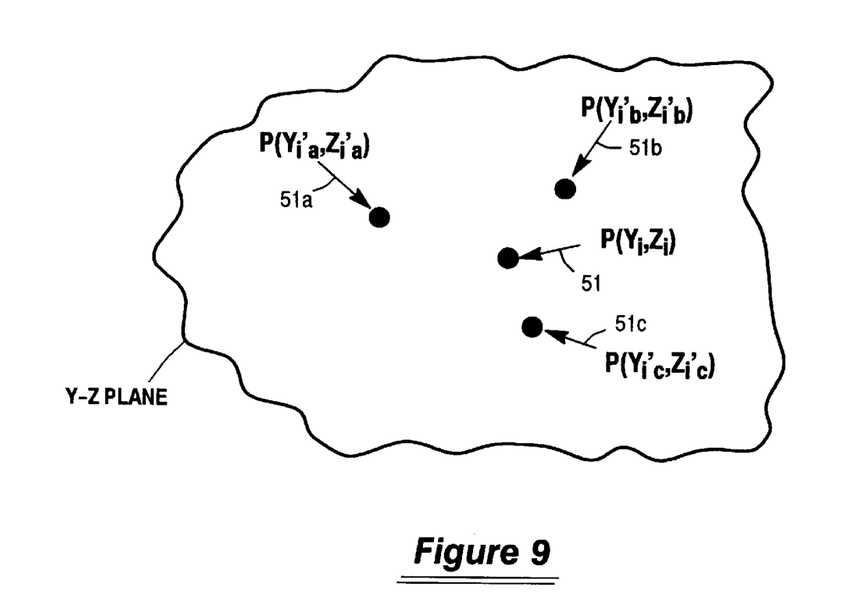
FIG. 9 shows a modification to the image generating step of FIG. 8 whereby each pixel in the image is generated from an interpolation of three pixels in the transformed model.

Alternatively, for each pixel in the access image, a corresponding pixel with identical Y-Z coordinates can be obtained by interpolation from the image of step S3. This is illustrated in FIG. 9 wherein reference numeral 51 identifies one particular pixel in the access image which has coordinates $Y_iZ_i$, and reference numerals 51a, 51b, 51c identify three adjacent pixels in the image from step S3 which define a triangle that encompasses the coordinates $Y_iZ_i$. By interpolating the three pixels 51a–51c at the coordinates $Y_iZ_i$, the value which is subtracted in the correlation process from pixel 51 is obtained.

Next, in step S5 as indicated in FIG. 1, the correlation value which is obtained by step S4 is compared to a predetermined a threshold value. If the correlation value exceeds the threshold, then the computer 10a sends a signal to the lock 10f which unlocks the door.

A primary feature of the above-described electronic system 10 is that the two dimensional image which is generated in step S3 from the transformed three-dimensional model, has a very high correlation to the access image of FIG. 4. This high correlation occurs because the X axis in the transformed three-dimensional model coincides with the direction in which the face in the access image is viewed.

Since the correlation between the image from step S3 and the access image $X_i$ is so large, the threshold value which must be exceeded in step S5 in order to gain access to the restricted area can be raised; and that in turn reduces the error rate with which the FIG. 1 system operates. Conversely, if the threshold value in step S5 is lowered, then the probability of the threshold being exceeded by a person who should not be given access to the restricted area is increased.

One electronic system 10 which constitutes a preferred embodiment of the present invention, as well as its method of operation, has now been described in detail. In addition, however, various changes and modifications can be made to the details of this preferred embodiment without departing from the nature and spirit of the invention.

For example, in the embodiment of FIGS. 1–9, the system 10 was described as recognizing a human face. However, as an alternative, that system can recognize any three-dimensional object. To make this modification, the face 20 in FIG. 1 is replaced with the three-dimensional object that is to be recognized, and the various images of the face 20 as shown in FIGS. 3A–3B, 4 and 5A–5B are replaced with corresponding images of the three-dimensional object.

As another modification, the camera 10b in the FIG. 1 system can include any type of sensor, rather than an infrared sensor, to generate the access image. For example, the camera 10b can generate the access image by using a visible light sensor, or an x-ray sensor, or an ultrasound sensor.

If a visible light sensor is used, then the three-dimensional model of the object which is to be recognized is a modification of the model in FIG. 2. In this modified model, all of the pixels P in the FIG. 2 model are eliminated; and all of radiuses $R(\theta,\phi)$ remain unchanged.

Using this modified model, steps S1 and S2 of the access phase are performed as previously described. Then, after the modified model is transformed such that the x-axis coincides with the viewing direction of the access image, the intensities for visible light pixels on that model are determined.

Figure 10:
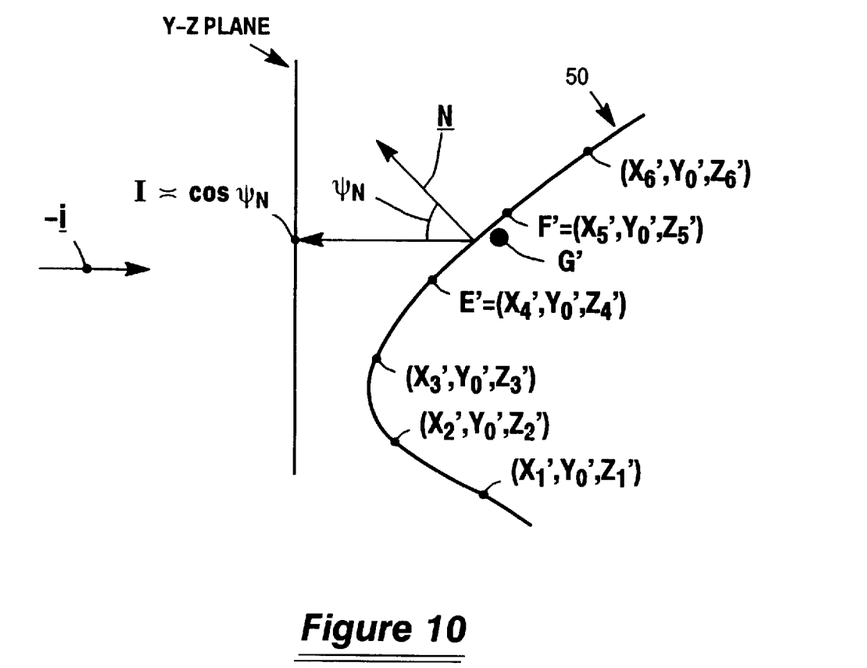
FIG. 10 shows a modification to the image generating step of FIG. 8 whereby each pixel in the image is derived from an angle ΨN which occurs between the viewing direction and a surface in the transformed model.

At each particular point on the modified model, the intensity "I" of the visible light pixel is proportional to $\cos\Psi_N$, where $\Psi_N$ is the angle between the vector $\underline{i}$ and another vector $\underline{N}$ which is perpendicular to the surface at that point. This is illustrated in FIG. 10. If $\Psi_N$ at a particular point is 0°, then the amount of visible light from the $-\underline{i}$ direction which is reflected back at that point is at a maximum; whereas if $\Psi_N$ is 90° or greater, then the amount of visible light which is reflected back is at a minimum.

Figure 11:
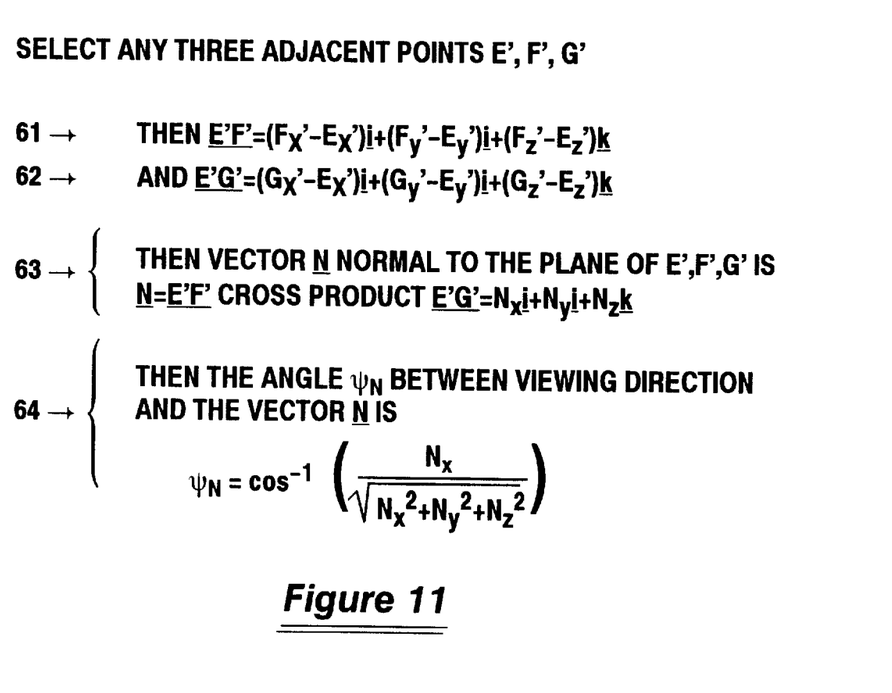
FIG. 11 shows how the angle ΨN is determined for each pixel in the FIG. 10 modification.

How the vector $\underline{N}$ and the angle $\Psi_N$ are determined from the transformed model is shown in FIG. 11. Initially, any three adjacent points E'F'G' on the transformed model are selected. In FIG. 10, points E' and F' lie in the plane of the figure, and point G' lies between them but into the plane of the figure. A vector $\underline{E'F'}$ from point E' to point F' is given by equation 61 in FIG. 11; and a vector $\underline{E'G'}$ from point E' to point G' is given by equation 62.

Next, the cross product of the two vectors $\underline{E'F'}$ and $\underline{E'G'}$ is generated; and that equals the vector N which is perpendicular to the plane that passes through the three points E'F'G'. This is stated by equation 63 in FIG. 11. That vector $\underline{N}$ has three components $N_X$, $N_Y$, and $N_Z$ which respectively lie on X, Y, and Z axis; and the angle $\Psi_N$ is determined from a ratio of those components as given by equation 64.

As another modification, the three particular points A, B, and C which are selected on the three-dimensional model in step S2, and the corresponding points A', B', C' on the access image, are not limited to those points which are shown in FIG. 2. For example, point C can be the center of the chin or the tip of the nose on the person face. As another example, points A and B can be on opposite sides of the bridge of the nose.

Also, as another modification, the substep of entering a PIN for each person during step S1' of the enrollment phase and step S1 of the access phase can be eliminated. In that case, the three-dimensional model which is used in steps S2–S4 of the access phase is selected as the model which projects an image on the Y-Z plane that has the highest correlation to the access image, before any transformation of the model occurs.

Accordingly, it is to be understood that the invention is not limited to the particular details of the preferred embodiments of FIGS. 1–11, but is defined by the appended claims.

What is claimed is:

1. A method of electronically recognizing a three-dimensional object X; said method including the steps of:
    storing in a memory, a three-dimensional digital model of the surface of said object X;
    acquiring a planar two-dimensional image of an unidentified object as viewed from an unpredictable direction;
    automatically aligning said model to said unpredictable direction by transforming said model, without any manual input from an operator, until three predetermined points in the transformed model and three corresponding points in said two-dimensional image have substantially the same coordinates in the plane of said image;
    generating, from said transformed three-dimensional model, a two-dimensional image of said model in said plane; and,
    identifying said unidentified object as said object X only if a correlation between said image of said unidentified object and said image of said model from said generating step exceeds a predetermined threshold.

2. A system for electronically recognizing a three-dimensional object X; said system being comprised of:
    a memory which stores a three-dimensional model of the surface of said object X;
    a camera which acquires a two-dimensional image of an unidentified object as viewed from an unpredictable direction;
    an automatic alignment means which aligns said model to said unpredictable direction by transforming said model without any manual input from an operator, until three predetermined points in the transformed model and three corresponding points in said two-dimensional image have substantially the same coordinates in the plane of said image;
    an image generating means for generating, from said transformed model, a two-dimensional image of said model in said plane; and,
    a correlating means, for identifying said unidentified object as said object X only if a correlation between said image of said unidentified object and said image of said model from said generating step exceeds a predetermined threshold.

3. A method according to claim 1 wherein said object X and said unidentified object are a human face.

4. A method according to claim 3 wherein said three predetermined points are the outside corners of two eyes on said face, and the center of a mouth on said face.

5. A method according to claim 3 wherein said three predetermined points are the outside corners of two eyes on said face, and the center of a chin on said face.

6. A method according to claim 3 wherein said three predetermined points are the outside corners of two eyes on said face and the tip of a nose on said face.

7. A method according to claim 3 wherein said three predetermined points are opposite points on the bridge of a nose on said face and the center of a mouth on said face.

8. A method according to claim 3 wherein said three-dimensional model includes a plurality of radiuses at respective angles θ and φ, each of which identifies a point on the surface of the model of said object X.

9. A method according to claim 3 wherein said three-dimensional model further includes a respective pixel value for multiple points on said surface of said face, and wherein said two-dimensional image of said model is obtained by projecting the pixel values onto said plane.

10. A method according to claim 3 wherein said two-dimensional image of said model is obtained by a) determining the angles between said unpredictable direction and respective vectors that extend perpendicularly from multiple points on the surface of said face, b) selecting a pixel value for each such point which increases as the corresponding angle decreases, and c) projecting the pixel values onto said plane.

11. A method according to claim 1 and further including the step of enabling said unidentified object to enter a secure area only if said correlation exceeds said predetermined threshold.

* * * * *